US009871393B2

(12) United States Patent
Hao

(10) Patent No.: US 9,871,393 B2
(45) Date of Patent: Jan. 16, 2018

(54) CHARGING METHOD AND USER EQUIPMENT

(71) Applicant: Huawei Device Co., Ltd., Shenzhen (CN)

(72) Inventor: Zhiming Hao, Xi'an (CN)

(73) Assignee: HUAWEI DEVICE CO., LTD., Shenzhen (CN)

(*) Notice: Subject to any disclaimer, the term of this patent is extended or adjusted under 35 U.S.C. 154(b) by 709 days.

(21) Appl. No.: 13/927,763

(22) Filed: Jun. 26, 2013

(65) Prior Publication Data

US 2013/0285599 A1 Oct. 31, 2013

Related U.S. Application Data

(63) Continuation of application No. PCT/CN2011/084680, filed on Dec. 26, 2011.

(30) Foreign Application Priority Data

Dec. 29, 2010 (CN) .......................... 2010 1 0624697

(51) Int. Cl.
H02J 7/00 (2006.01)
H01M 10/44 (2006.01)
(52) U.S. Cl.
CPC ........... *H02J 7/007* (2013.01); *H01M 10/443* (2013.01); *H02J 7/0031* (2013.01); *H02J 7/0073* (2013.01);
(Continued)

(58) Field of Classification Search
CPC ........ H02J 7/0031; H02J 7/007; H02J 7/0072; H02J 7/0073; H02J 7/0085; H02J 7/0088;
(Continued)

(56) References Cited

U.S. PATENT DOCUMENTS 3,732,481 A * 5/1973 Mas ...................... H02J 7/0093
320/129
6,281,663 B1 8/2001 Yagi et al.
(Continued)

FOREIGN PATENT DOCUMENTS

CN 1269616 A 10/2000
CN 1845418 A 10/2006
(Continued)

*Primary Examiner* — Drew A Dunn
*Assistant Examiner* — Michael Dibenedetto
(74) *Attorney, Agent, or Firm* — Brinks Gilson & Lione

(57) ABSTRACT

The present disclosure provides a charging method and a user equipment. The charging method includes: measuring a maximum output current value of a charger according to a received fast charging instruction; setting a charging current value for a battery of a user equipment according to the maximum output current value; receiving, from the charger, a first charging current corresponding to the charging current value; and disconnecting the charger if a charging temperature of the battery is detected to be higher than a preset temperature. The charging method and user equipment provided in the present disclosure solve problems in the prior art that the charger is damaged because of overloading in case of emergency charging, and that the battery of the user equipment is overcharged because of an over-high charging temperature, so that safe and fast charging is implemented.

9 Claims, 3 Drawing Sheets

(52) U.S. Cl.
CPC ..... *H02J 7/0091* (2013.01); *H02J 2007/0062* (2013.01)

(58) Field of Classification Search
CPC ........... H02J 7/0091; H02J 2007/0062; H01M 10/44; H01M 10/441; H01M 10/443; H01M 10/446
See application file for complete search history.

(56) References Cited

U.S. PATENT DOCUMENTS

| | | | |
|---|---|---|---|
| 2005/0237025 A1 | 10/2005 | Osswald | |
| 2007/0188134 A1* | 8/2007 | Hussain | H01M 10/44 320/114 |
| 2008/0258688 A1* | 10/2008 | Hussain | H02J 7/06 320/145 |
| 2009/0102431 A1 | 4/2009 | Kung et al. | |
| 2009/0195215 A1 | 8/2009 | Sato et al. | |
| 2009/0273319 A1* | 11/2009 | Young | H02J 7/0052 320/162 |
| 2010/0295503 A1* | 11/2010 | Bourilkov | H02J 7/0006 320/106 |

FOREIGN PATENT DOCUMENTS

| | | |
|---|---|---|
| CN | 100364206 C | 1/2008 |
| CN | 101504996 A | 8/2009 |
| CN | 101740837 A | 6/2010 |
| CN | 101872990 A | 10/2010 |
| CN | 102122739 A | 7/2011 |
| EP | 2637247 A1 | 9/2013 |
| JP | 2005-312298 A | 11/2005 |
| JP | 2005354893 | 12/2005 |
| JP | 2006-049331 A | 2/2006 |
| JP | 2009165329 A | 7/2009 |
| KR | 10-2009-0086161 A | 8/2009 |

* cited by examiner

CHARGING METHOD AND USER EQUIPMENT

CROSS-REFERENCE TO RELATED APPLICATIONS

This application is a continuation of International Application No. PCT/CN2011/084680, filed on Dec. 26, 2011, which claims priority to Chinese Patent Application No. CN201010624697.1, filed on Dec. 29, 2010, both of which are hereby incorporated by reference in their entireties.

FIELD

Embodiments of the present disclosure relate to an electronic technology, and in particular, to a charging method and a user equipment.

BACKGROUND

At present, a mobile phone battery is generally charged first by a constant current and then by a constant voltage. The main process is as follows: constant-current charging is performed on the mobile phone battery; when the voltage of the mobile phone battery reaches a charging cutoff voltage, an actual voltage of the battery is partially virtual-high because of internal resistance of the battery, and the charging current needs to be lowered continuously, that is, the mobile phone battery continues to be charged by using a constant voltage until the virtual-high part is completely cleaned up, so that the charging is finished.

During the implementation of the present disclosure, it is found that the prior art at least has the following problems: in emergency cases, when the mobile phone battery needs to be fast charged, because a load capacity of a present charger is limited, the charger may be damaged because of overloading if a large current is output. For example, a nominal 5 V 500 mA charger may be damaged because the charger is overloaded if a current of 1 A is output. In addition, when a lithium-ion battery is charged with a large current, the internal temperature may rise because of the large current, and therefore a risk of battery overcharging exists.

SUMMARY

Embodiments of the present disclosure provide a charging method and a user equipment to solve problems in the prior art that a charger is damaged because of overloading in case of emergency charging, and that a battery of a user equipment is overcharged because of an over-high charging temperature, so that the charging is performed safely and fast.

An embodiment of the present disclosure provides a charging method. The method includes: measuring a maximum output current value of a charger according to a received fast charging instruction; setting a charging current value for a battery of a user equipment according to the maximum output current value; receiving, from the charger, a first charging current corresponding to the charging current value; and disconnecting the charger if a charging temperature of the battery is detected to be higher than a preset temperature.

An embodiment of the present disclosure provides a user equipment. The user equipment includes: a measuring module, configured to measure a maximum output current value of a charger according to a received fast charging instruction; a charging current setting module, configured to set a charging current value for a battery of the user equipment according to the maximum output current value; a charging current receiving module, configured to receive, from the charger, a first charging current corresponding to the charging current value; and a charging temperature control module, configured to disconnect the charger if a charging temperature of the battery is detected to be higher than a preset temperature.

With the charging method and user equipment in the embodiments of the present disclosure, the maximum output current value of the charger is measured according to the received fast charging instruction, and the charging current value for the battery of the user equipment is set according to the maximum output current value, so that the first charging current corresponding to the charging current value is received from the charger; and the charging is stopped by disconnecting the charger when the charging temperature of the battery is detected to be higher than the preset temperature. Thereby, the problems in the prior art that the charger is damaged because of overloading in case of emergency charging, and that the battery of the user equipment is overcharged because of an over-high charging temperature are solved, and safe and fast charging is implemented.

BRIEF DESCRIPTION OF THE DRAWINGS

To describe the solutions in the embodiments of the present disclosure more clearly, the following briefly introduces the accompanying drawings needed for describing the embodiments. Apparently, the accompanying drawings in the following description show some embodiments of the present disclosure, and persons of ordinary skill in the art may still derive other drawings from these accompanying drawings without creative efforts.

DETAILED DESCRIPTION OF THE EMBODIMENTS

To make the objectives, solutions, and advantages of the embodiments of the present disclosure more comprehensible, the following clearly and describes the solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
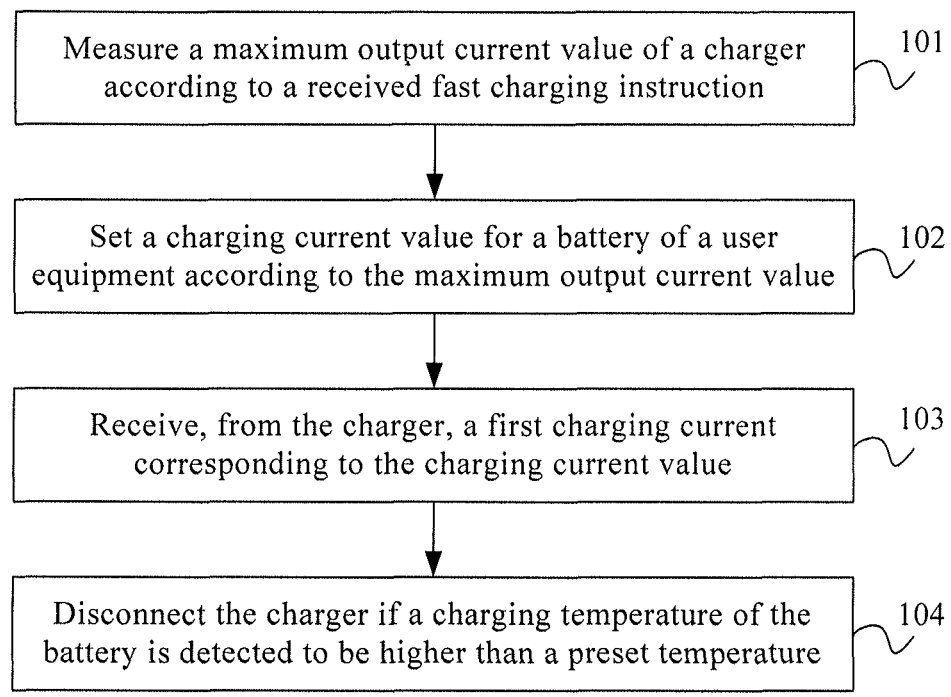
FIG. 1 is a flowchart of a charging method according to an embodiment of the present disclosure.

FIG. 1 is a flowchart of a charging method according to an embodiment of the present disclosure. As shown in FIG. 1, the method of the embodiment includes:

Step 101: Measure a maximum output current value of a charger according to a received fast charging instruction.

In this embodiment, a user equipment may receive the fast charging instruction input by a user, where the user equipment may be an equipment like a mobile phone, a digital camera, a personal digital assistant (Personal Digital Assistant, briefed as PDA), or a moving pictures experts group-4 (Moving Pictures Experts Group-4/Motion Pictures Experts Group-4, briefed as MP4). For example, the mobile phone is taken as an example; when the mobile phone needs to be charged, the mobile phone may display a choice menu and provide a fast charging mode and a normal charging mode on the choice menu, so that the user may select fast charging or normal charging.

In addition, a specific implementation manner of the user equipment measuring a maximum output current value of the charger when receiving the fast charging instruction is as follows: a charging current value is preset through a built-in metal-oxide-semiconductor field-effect-transistor (Metal-Oxide-Semiconductor Field-Effect-Transistor, briefed as MOSFET), and an actual output current value of the charger corresponding to the preset charging current value may be measured through a built-in analog-to-digital converter (Analog-to-Digital Converter, briefed as ADC); then the actual output current value of the charger and the preset charging current value are determined; and if the actual output current value of the charger is greater than the preset charging current value, the preset charging current value is updated, and the actual output current value of the charger corresponding to the updated preset charging current value is measured, and if the actual output current value is smaller than the updated charging current value, the actual output current value is determined to be a maximum output current value.

For example, when the user equipment needs to be charged by a nominal 5 V 500 mA charger, when the user equipment sets the charging current value to 300 mA through the built-in MOSFET, the actual output current value of the charger is measured through the built-in ADC to be 450 mA; when the user equipment sets the charging current value to 450 mA, the actual output current value of the charger is measured through the built-in ADC to be 450 mA; when the user equipment sets the charging current value to 501 mA, the actual output current value of the charger is measured through the built-in ADC to be 500 mA, and then the user equipment determines that when the charging current value is set to 500 mA, the corresponding actual output value of the charger starts to be smaller than the charging current value, and measures that the 500 mA is the maximum output current value of the charger.

Step 102: Set a charging current value for a battery of a user equipment according to the maximum output current value.

For example, after the maximum output current value of the charger is measured, in order to reserve some margins for the load of the charging and prevent the charger from overloading because of its bad conformance, a range of the charging current value of the user equipment may be set to 80%-90% of the maximum output current value, where the setting may be performed by the user equipment which automatically determines the charging current value for the battery of the user equipment according to the maximum output current value and the range of the maximum output current value corresponding to the charging current value set by the user in advance, or by the user equipment which provides a user interface for the user to select the range of the maximum output current value corresponding to the charging current value, and determines the charging current value for the battery of the user equipment according to the range selected by the user.

Step 103: Receive, from the charger, a first charging current corresponding to the charging current value.

Step 104: Disconnect the charger if a charging temperature of the battery is detected to be higher than a preset temperature.

In this embodiment, after the charging current value is set for the battery of the user equipment, the current corresponding to the charging current value may be received from a connected charger. In addition, during the process of fast charging, the temperature of the battery of the user equipment may rise with the charging. In order to prevent the battery from being overcharged because of an over-high temperature, a preset temperature may be set. When the charging temperature of the battery is higher than the preset temperature, the charger is disconnected, so that the charger stops charging the user equipment.

In this embodiment, the maximum output current value of the charger is measured according to the received fast charging instruction, and the charging current value for the battery of the user equipment is set according to the maximum output current value, so that the first charging current corresponding to the charging current value is received from the charger; and the charging is stopped by disconnecting the charger when the charging temperature of the battery is detected to be higher than the preset temperature. Thereby, the problems in the prior art that the charger is damaged because of overloading in case of emergency charging, and that the battery of the user equipment is overcharged because of an over-high charging temperature are solved, and safe and fast charging is implemented.

Figure 2:
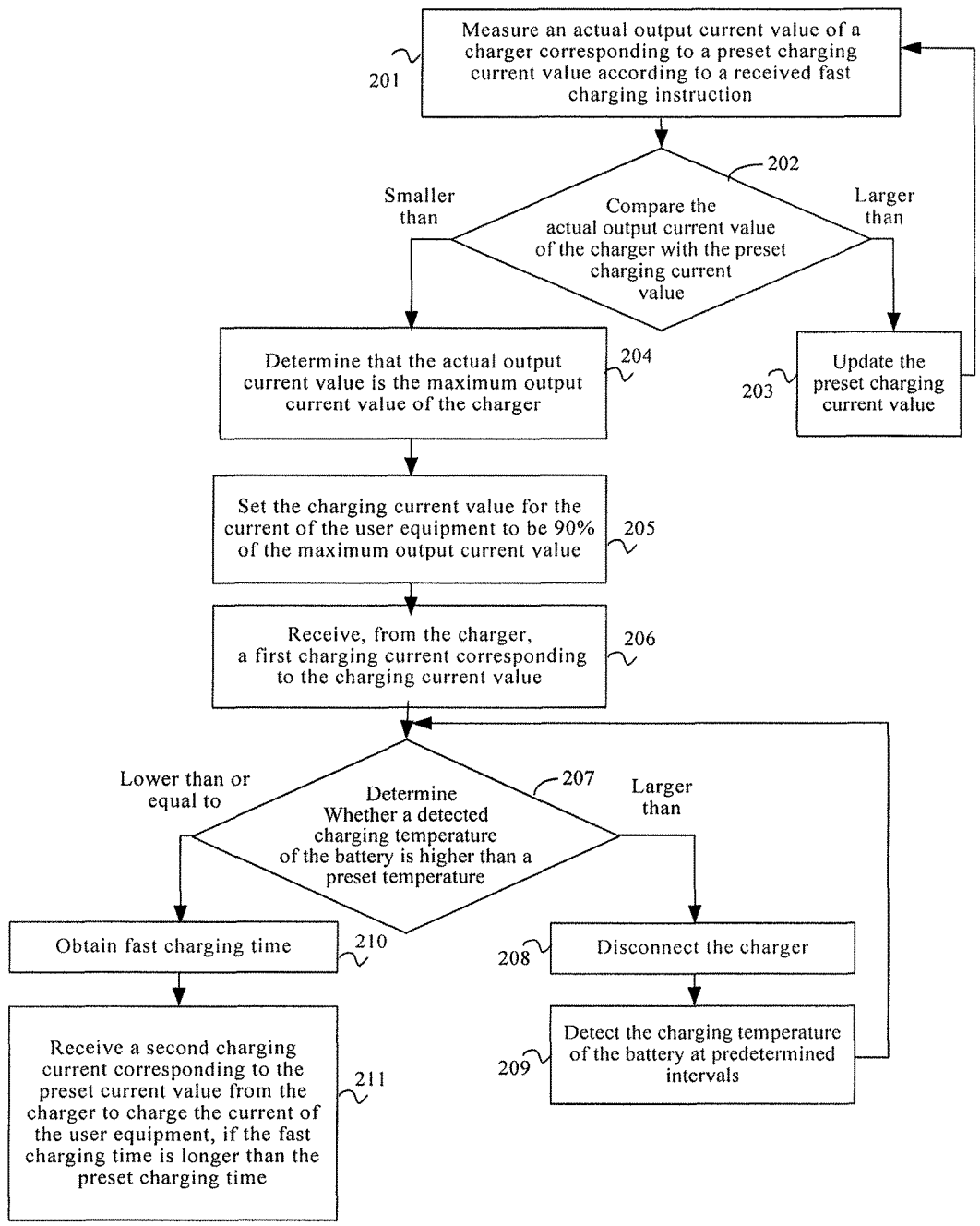
FIG. 2 is a flowchart of a charging method according to another embodiment of the present disclosure.

FIG. 2 is a flowchart of a charging method according to another embodiment of the present disclosure. As shown in FIG. 2, the method of the embodiment includes:

Step 201: Measure an actual output current value of a charger corresponding to a preset charging current value according to a received fast charging instruction.

Step 202: Compare the actual output current value of the charger with the preset charging current value, and if the actual output current value of the charger is greater than the preset charging current value, execute step 203, or if the actual output current value of the charger is smaller than the preset charging current value, execute step 204.

Step 203: Update the preset charging current value, and execute step 201.

Step 204: Determine that the actual output current value is the maximum output current value of the charger.

Step 205: Set the charging current value for the current of the user equipment to 90% of the maximum output current value.

In this embodiment, the implementation manner of step 205 is similar to the implementation manner of step 102 shown in FIG. 1, and is not further described.

Step 206: Receive, from the charger, a first charging current corresponding to the charging current value.

Step 207: Determine whether a detected charging temperature of the battery is higher than a preset temperature, and if the charging temperature of the battery is higher than the preset temperature, execute step 208, or if the charging temperature of the battery is lower than or equal to the preset temperature, execute step 210.

Step 208: Disconnect the charger.

Step 209: Detect the charging temperature of the battery at predetermined intervals, and execute step 207.

Step 210: Obtain fast charging time.

Step 211: Receive, from the charger, a second charging current corresponding to the preset current value to charge the battery of the user equipment, if the fast charging time is longer than the preset charging time.

In this embodiment, when the charging temperature of the battery is higher than the preset temperature, in order to prevent the battery from being overcharged, the user equipment is disconnected from the charger, the charger temporarily stops charging the user equipment, and the charging temperature of the battery is detected, and when the charging temperature of the battery is detected to be lower than or equal to the preset temperature, the user equipment is reconnected to the charger, and a first charging current corresponding to the charging current value is received from the charger, that is, the charger continues to charge the user equipment.

In addition, the service life of the battery is fast reduced because the fast charging is performed for a long time. Therefore, the user equipment may obtain fast charging time, and switch the user equipment to a normal charging mode when the fast charging time is longer than the preset charging time, where the specific implementation manner is as follows: the second charging current corresponding to the preset current value is received from the charger to charge the battery of the user equipment. When a voltage of the battery of the user equipment reaches the charging cutoff voltage, an actual voltage of the battery is partially virtual-high because of internal resistance of the battery, and the second charging current needs to be lowered continuously, that is, the battery of the user equipment continues to be charged by using a constant voltage until the virtual-high part is completely cleaned up, so that the charging is finished.

In this embodiment, the maximum output current value of the charger is measured according to the received fast charging instruction, and the charging current value for the battery of the user equipment is set to be 90% of the maximum output current value, so that the first charging current corresponding to the charging current value is received from the charger. The charging temperature of the battery is detected, and whether the charging temperature of the battery is higher than the preset temperature is determined, and if the charging temperature is higher than the preset temperature value, the charger is disconnected, thereby stopping charging. The charging temperature is detected in real time, and if the charging temperature is lower than the preset temperature value again, the charger is connected to continue the charging. Thereby, the problems in the prior art that the charger is damaged because of overloading in case of emergency charging, and that the battery of the user equipment is overcharged because of an over-high charging temperature are solved, and safe and fast charging is implemented. In addition, the user equipment may be switched from an emergency charging mode to a normal charging mode by presetting the charging time, so that damage to the service life of the battery is effectively reduced.

Figure 3:
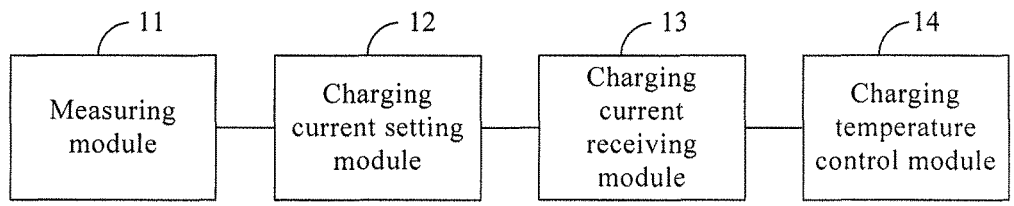
FIG. 3 is a schematic structural diagram of a user equipment according to an embodiment of the present disclosure.

FIG. 3 is a schematic structural diagram of a user equipment according to an embodiment of the present disclosure. As shown in FIG. 3, the user equipment of the embodiment includes a measuring module 11, a charging current setting module 12, a charging current receiving module 13, and a charging temperature control module 14, where the measuring module 11 is configured to measure a maximum output current value of a charger according to a received fast charging instruction; the charging current setting module 12 is configured to set a charging current value for a battery of the user equipment according to the maximum output current value; the charging current receiving module 13 is configured to receive, from the charger, a first charging current corresponding to the charging current value; and the charging temperature control module 14 is configured to disconnect the charger when a charging temperature of the battery is detected to be higher than a preset temperature.

The user equipment of this embodiment may execute the solution of the method embodiment shown in FIG. 1, and the principles thereof are similar, and are not further described.

In this embodiment, the maximum output current value of the charger is measured according to the received fast charging instruction, and the charging current value for the battery of the user equipment is set according to the maximum output current value, so that the first charging current corresponding to the charging current value is received from the charger; and the charging is stopped by disconnecting the charger when the charging temperature of the battery is detected to be higher than the preset temperature. Thereby, the problems in the prior art that the charger is damaged because of overloading in case of emergency charging, and that the battery of the user equipment is overcharged because of an over-high charging temperature are solved, and safe and fast charging is implemented.

Figure 4:
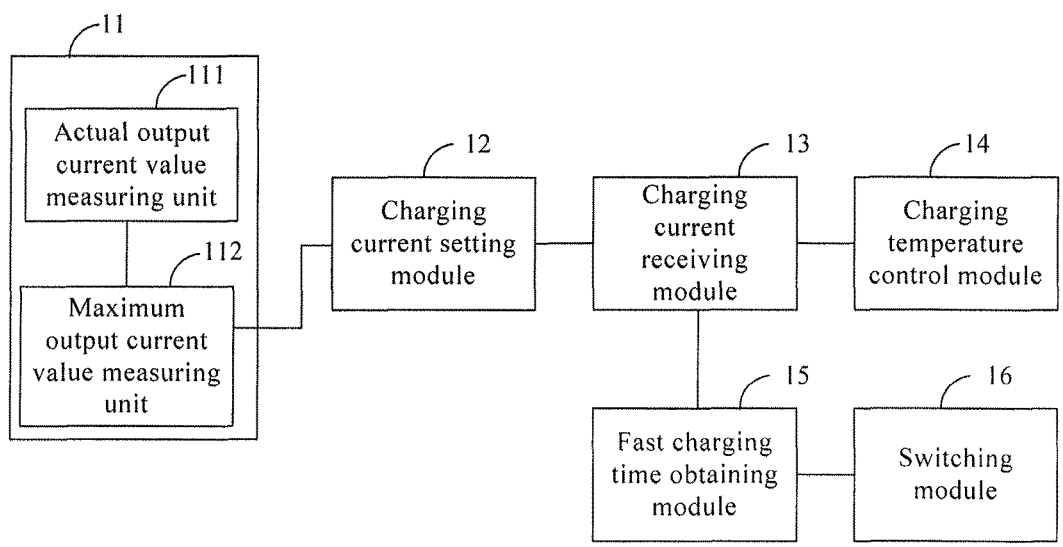
FIG. 4 is a schematic structural diagram of a user equipment according to another embodiment of the present disclosure.

FIG. 4 is a schematic structural diagram of a user equipment according to another embodiment of the present disclosure. As shown in FIG. 4, on the basis of the embodiment shown in FIG. 3, the measuring module 11 of the user equipment includes an actual output current value measuring unit 111 and a maximum output current value measuring unit 112, where the actual output current value measuring unit 111 is configured to measure an actual output current value of the charger corresponding to the preset charging current value according to the received fast charging instruction; and the maximum output current value measuring unit 112 is configured to compare the actual output current value of the charger with the preset charging current value, and if the actual output current value of the charger is greater than the preset charging current value, update the preset charging current value, and measure an actual output current value of the charger corresponding to the updated preset charging current value by using the actual output current value measuring unit 111, then compare the actual output current value of the charger with the updated preset charging current value, and after the measured actual output current value of the charger corresponding to the updated preset charging current value is smaller than the updated preset charging current value, determine that the measured actual output current value of the charger corresponding to the updated preset charging current value is the maximum output current value of the charger.

Further, the charging temperature control module 14 is further configured to connect the charger if the charging temperature of the battery is detected to be lower than the preset temperature again.

Still further, the user equipment may further include fast charging time obtaining module 15 and a switching module 16, where the fast charging time obtaining module 15 is configured to obtain fast charging time, and the switching module 16 is configured to charge the battery of the user equipment by receiving, from the charger, a second charging current corresponding to the preset current value if the fast charging time is longer than the preset charging time.

Still further, the charging current setting module 12 is configured to set the charging current value for the battery of the user equipment to 80%-90% of the maximum output current value.

The user equipment of this embodiment may execute the solution of the method embodiment shown in FIG. 2, and the principles thereof are similar, and are not further described.

In this embodiment, the maximum output current value of the charger is measured according to the received fast charging instruction, and the range of the charging current value for the battery of the user equipment is set to 80%- 90% of the maximum output current value, so that the first charging current corresponding to the charging current value is received from the charger. The charging temperature of the battery is detected, and whether the charging temperature of the battery is higher than the preset temperature is determined, and if the charging temperature is higher than the preset temperature value, the charger is disconnected, thereby stopping charging. The charging temperature is detected in real time, and if the charging temperature is lower than the preset temperature value again, the charger is connected to continue the charging. Thereby the problems in the prior art that the charger is damaged because of overloading in case of emergency charging, and that the battery of the user equipment is overcharged because of an overhigh charging temperature are solved, and safe and fast charging is implemented. In addition, the user equipment may be switched from an emergency charging mode to a normal charging mode by presetting the charging time, so that damage to the service life of the battery is effectively reduced.

Further, the user equipment in the above embodiment may be a user equipment with a charging function, such as a mobile phone, a digital camera, a PDA, and an MP4. In the case that the user equipment is a mobile phone, the actual output current value measuring unit 111 may be an ADC, and the charging temperature control module 14 may be a resistor of a negative temperature coefficient (Negative Temperature Coefficient, briefed as NTC).

Still further, the mobile phone further includes a radio-frequency circuit and a voice-frequency circuit, so that basic functions of the mobile may be implemented. A microphone and a loudspeaker in the radio-frequency circuit and voice-frequency circuit are briefly introduced respectively in the following: the radio-frequency circuit is mainly configured to establish communication with a wireless network to implement data receiving and sending between the mobile phone and the wireless network; the microphone is configured to collect a voice and convert the collected voice into voice data, so that the mobile phone sends the voice data to the wireless network via the radio-frequency circuit; the loudspeaker is configured to restore the voice data into a voice, where the voice data is received from the wireless network via the radio-frequency circuit, and play the voice to a user.

Persons of ordinary skill in the art may understand that all or a part of the steps of the methods in the embodiments may be implemented by a program instructing relevant hardware such as a hardware processor. The program may be stored in a computer readable storage medium. When the program is run, the steps of the methods in the embodiments are performed by the hardware processor. The storage medium may be any medium that is capable of storing program codes, such as a ROM, a RAM, a magnetic disk, or an optical disk.

Finally, it should be noted that the foregoing embodiments are merely intended for describing the solutions of the present disclosure other than limiting the present disclosure. Although the present disclosure is described in detail with reference to the foregoing embodiments, persons of ordinary skill in the art should understand that they may still make modifications to the solution described in the foregoing embodiments or make equivalent substitutions to some features thereof, without departing from the idea and scope of the solution of the embodiments of the present disclosure.

What is claimed is:

1. A charging method, comprising:
   measuring a maximum output current value of a charger according to a received fast charging instruction;
   determining a charging current value for a battery of a user equipment according to the maximum output current value;
   receiving, from the charger, an initial first charging current corresponding to the charging current value; and
   disconnecting the charger if a charging temperature of the battery is detected to be higher than a preset temperature,
   wherein measuring the maximum output current value of the charger comprises:
   measuring an actual output current value of the charger corresponding to a preset charging current value; and
   determining the actual output current value of the charger and the preset charging current value, and if the actual output current value of the charger is greater than the preset charging current value, increasing the preset charging current value and repeating the above step, and after the measured actual output current value of the charger corresponding to the increased preset charging current value is smaller than the increased preset charging current value, determining the measured actual output current value of the charger corresponding to the increased preset charging current value to be the maximum output current value of the charger.

2. The charging method according to claim 1, further comprising:
   connecting the charger if the charging temperature of the battery is detected to be lower than the preset temperature again.

3. The charging method according to claim 1, further comprising:
   obtaining fast charging time; and
   receiving, from the charger, a second charging current corresponding to a preset current value to charge the battery of the user equipment, if the fast charging time is longer than a preset charging time.

4. The charging method according to claim 1, wherein determining the charging current value for the battery of the user equipment according to the maximum output current value comprises:
   setting a range of the charging current value for the battery of the user equipment to be 80%-90% of the maximum output current value.

5. A user equipment, comprising:
   a measuring module, configured to measure a maximum output current value of a charger according to a received fast charging instruction;
   a charging current setting module, configured to determine a charging current value for a battery of the user equipment according to the maximum output current value;
   a charging current receiving module, configured to receive, from the charger, an initial first charging current corresponding to the charging current value; and
   a charging temperature control module, configured to disconnect the charger if a charging temperature of the battery is detected to be higher than a preset temperature,
   wherein the measuring module comprises:
   an actual output current value measuring unit, configured to measure an actual output current value of the charger corresponding to a preset charging current value according to the received fast charging instruction; and a maximum output current value measuring unit, configured to compare the actual output current value of the charger with the preset charging current value, and if the actual output current value of the charger is greater than the preset charging current value, increase the preset charging current value and repeat the above step, and after the measured actual output current value of the charger corresponding to the increased preset charging current value is smaller than the increased preset charging current value, determine that the measured actual output current value of the charger corresponding to the increased preset charging current value is the maximum output current value of the charger.

6. The user equipment according to claim 5, wherein the charging temperature control module is further configured to connect the charger if the charging temperature of the battery is detected to be lower than the preset temperature again.

7. The user equipment according to claim 5 further comprising:

a fast charging time obtaining module, configured to obtain a fast charging time; and a switching module, configured to charge the battery of the user equipment by receiving, from the charger, a second charging current corresponding to a preset current value if the fast charging time is longer than a preset charging time.

8. The user equipment according to claim 5, wherein the charging temperature control module is a thermal resistor of a negative temperature coefficient.

9. The user equipment according to claim 5, wherein the charging current setting module is configured to set the charging current value for the battery of the user equipment to be 80%-90% of the maximum output current value.

* * * * *